United States Patent
Mukherjee et al.

(10) Patent No.: US 10,637,779 B1
(45) Date of Patent: Apr. 28, 2020

(54) METHODS, SYSTEMS, AND COMPUTER READABLE MEDIA FOR DIAMETER SIGNALING MESSAGE EXTERNAL IDENTIFIER ADDRESS RESOLUTION AND ROUTING

(71) Applicant: Oracle International Corporation, Redwood Shores, CA (US)

(72) Inventors: Abhishek Mukherjee, Bangalore (IN); Sridhar Karuturi, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/162,101

(22) Filed: Oct. 16, 2018

(51) Int. Cl.
| | |
|---|---|
| *G06F 15/173* | (2006.01) |
| *H04L 12/745* | (2013.01) |
| *H04L 12/773* | (2013.01) |
| *H04W 4/70* | (2018.01) |
| *H04W 8/04* | (2009.01) |
| *H04L 29/06* | (2006.01) |

(52) U.S. Cl.
CPC ............ *H04L 45/748* (2013.01); *H04L 45/60* (2013.01); *H04L 65/1003* (2013.01); *H04W 4/70* (2018.02); *H04W 8/04* (2013.01)

(58) Field of Classification Search
CPC .... H04L 45/60; H04L 45/708; H04L 65/1003
USPC ........................................................ 709/242
See application file for complete search history.

(56) References Cited

U.S. PATENT DOCUMENTS

| | | | |
|---|---|---|---|
| 2012/0236871 A1* | 9/2012 | Wallace | H04L 61/10 370/401 |
| 2014/0092808 A1* | 4/2014 | Jain | H04W 24/02 370/328 |
| 2016/0119231 A1* | 4/2016 | Bournelle | H04L 45/00 370/389 |

(Continued)

OTHER PUBLICATIONS

Fajardo et al., "RFC 6733—Diameter Base Protocol," Internet Engineering Task Force (IETF), pp. 1-153 (Oct. 2012).

(Continued)

*Primary Examiner* — Frantz B Jean
(74) *Attorney, Agent, or Firm* — Jenkins, Wilson, Taylor & Hunt P.A.

(57) ABSTRACT

A method for Diameter signaling message external identifier address resolution and routing includes receiving a Diameter signaling message, decoding the Diameter signaling message and determining that an external identifier attribute value pair (AVP) is present in the Diameter signaling message. The method further includes decoding contents of the external identifier AVP, performing a lookup in a domain table using a domain identifier component of the external identifier AVP and locating an entry corresponding to the domain identifier component, determining whether a local identifier table is configured for the domain identifier component, performing a lookup in a local identifier table using a local identifier component of the external identifier AVP, populating at least one Diameter routing AVP of the Diameter signaling message with Diameter routing information obtained from the lookup in the domain table or the lookup in the local identifier table, and routing the Diameter signaling message using the Diameter routing information.

20 Claims, 7 Drawing Sheets

(56) References Cited

U.S. PATENT DOCUMENTS

2017/0150332 A1* 5/2017 Palanisamy ............ H04W 4/70
2018/0152984 A1* 5/2018 Palanisamy ............ H04W 4/70

OTHER PUBLICATIONS

3GPP, "Technical Specification Group Services and System Aspects; Architecture enhancements to facilitate communications with packet data networks and applications," TS 23.682, V16.0.0 (Release 16), pp. 1-126 (Sep. 2018).

3GPP, "Technical Specification Group Core Network and Terminals; Numbering, addressing and identification" TS 23.003, V15.5.0 (Release 15), pp. 1-128 (Sep. 2018).

3GPP, "Technical Specification Group Core Network and Terminals; Home Subscriber Server (HSS) diameter interfaces for interworking with packet data networks and applications," TS 29.336, V15.3.0, pp. 1-71 (Jun. 2018).

3GPP, "Technical Specification Group Core Network and Terminals; Tsp interface protocol between the MTC Interworking Function (MTC-IWF) and Service Capability Server (SCS)," TS 29.368, V15.0.0, . . . pp. 1-33 (Jun. 2018).

Aboba et al., "RFC 4282—The Network Access Identifier," Network Working Group, pp. 1-17 (Dec. 2005).

Notification of Transmittal of the International Search Report and the Written Opinion of the International Searching Authority, or the Declaration for International Application No. PCT/US2019/044445 (dated Sep. 30, 2019).

* cited by examiner

METHODS, SYSTEMS, AND COMPUTER READABLE MEDIA FOR DIAMETER SIGNALING MESSAGE EXTERNAL IDENTIFIER ADDRESS RESOLUTION AND ROUTING

TECHNICAL FIELD

The subject matter described herein relates to address resolution for Diameter signaling messages. More particularly, the subject matter described herein relates to methods, systems, and computer readable media for Diameter signaling message address resolution and routing based on contents of an external identifier attribute value pair in Diameter signaling messages.

BACKGROUND

Address resolution in telecommunications signaling networks refers to the process of translating an unroutable address into a routable address. In conventional telecommunications signaling networks, address resolution has been performed based on numeric identifiers, such as the mobile subscriber integrated services digital network (MSISDN) number or the international mobile station identity (IMSI). For example, in signaling system #7 (SS7) signaling networks, the global title address located in the signaling connection control part (SCCP) or mobile application part (MAP) of a message may contain MSISDN number. Global title translation at a signal transfer point may translate the numeric global title address into a point code and subsystem number or an Internet protocol (IP) address corresponding to the destination for the message. Similarly, in Diameter signaling messages, MSISDNs and IMSIs have been resolved into addresses for destination realms and destination hosts.

With the advent of Internet of things (IoT) devices, the number of user entities or devices is expected to increase multifold. Due to the anticipated increase in number of devices, using the MSISDN or IMSI to identify such devices may not be practical because the number space may not accommodate large numbers of devices.

To account for this number space deficiency, IoT devices can be identified using an external identifier. The external identifier is defined in $3^{rd}$ Generation Partnership Project (3GPP) Technical Specification (TS) 23.003, "Technical Specification Group Core Network and Terminals; Numbering addressing and identification," Release 15, September 2018, the disclosure of which is incorporated herein by reference in its entirety. According to 3GPP TS 23.003, the external identifier is an identifier used to facilitate communications with packet data networks and applications, such as machine type communications (MTC) applications on the external network. The form for the external identifier is:

<local identifier>@<domain identifier>

The domain identifier is specified as a newly registered Internet domain name according to Internet Engineering Task Force (IETF) Request for Comments (RFC) 4282, "The Network Access Identifier" (December 2005), the disclosure which is incorporated herein by reference in its entirety. According to 3GPP TS 23.682, "Technical Specification Group Services and System Aspects; Architecture enhancements to facilitate communications with packet data networks and applications," Release 16, September 2018, the disclosure of which is incorporated herein by reference in its entirety, the external identifier identifies the subscription associated with an IMSI and a local identifier may be a number. For example, in Section 19.7.2, 3GPP 23.682 specifies the following as an example of an external identifier:

123456789@domain.com.

As described above, traditional address resolution relies on numeric parameters, such as the MSISDNs or IMSIs. If devices are identified using external identifiers instead of MSISDNs and IMSIs, conventional numeric-only address resolution will not be able to resolve the external identifiers into routable addresses.

Even in instances where address resolution based on the external identifier is performed, the address resolution may not result in a sufficiently granular division of services in a service provider's network. For example, if external identifier address resolution is performed based solely on an exact match of the domain component of the external identifier, there is no ability to segregate services based on subdomains within a service provider's domain or based on different MTC device groups within the service provider's domain.

Accordingly, there exists a need for methods, systems, and computer readable media for Diameter signaling message external identifier address resolution and routing.

SUMMARY

Methods, systems, and computer readable media for Diameter signaling message external identifier address resolution and routing are provided. One method includes receiving a Diameter signaling message, decoding the Diameter signaling message and determining that an external identifier attribute value pair (AVP) is present in the Diameter signaling message. The method further includes, in response to determining that an external identifier AVP is present in the Diameter signaling message, decoding contents of the external identifier AVP. As used herein, the term "decoding" includes parsing contents of the Diameter signaling message to extract values corresponding to Diameter message attributes.

The method further includes performing a lookup in a domain table using a domain identifier component of the external identifier AVP and locating an entry corresponding to the domain identifier component, determining whether a local identifier table is configured for the domain identifier component, in response to determining that a local identifier is configured for the domain identifier component, performing a lookup in a local identifier table using a local identifier component of the external identifier AVP, populating at least one Diameter routing AVP of the Diameter signaling message with Diameter routing information obtained from the lookup in the domain table or the lookup in the local identifier table, and routing the Diameter signaling message using the Diameter routing information.

The term "Diameter routing information" refers to information usable to route a signaling message in a Diameter signaling network. The Diameter routing information may be of the form specified in IETF RFC 6733, Diameter Base Protocol, October 2012, the disclosure of which is incorporated herein by reference in its entirety. The term "Diameter routing AVP" may refer to the Diameter routing AVP specified in IETF RFC 6733 and may include a destination realm and optionally a destination host component.

In one exemplary implementation of the subject matter described herein, receiving a Diameter signaling message includes receiving a Diameter signaling message on an S6a, an S6t, or a Tsp interface. If the Diameter signaling message is received on a Tsp interface, decoding the Diameter signaling message to determine that an external identifier is present includes decoding a device action grouped AVP and extracting the external identifier AVP from the device action grouped AVP.

In another exemplary implementation of the subject matter described herein, performing the lookup in the domain table includes searching the domain table for an exact match on the domain identifier component. In an alternate implementation of the subject matter described herein, performing the lookup in the domain table includes searching the domain table for a longest subdomain match on the domain identifier component.

In yet another exemplary implementation of the subject matter described herein, a local identifier table is configured for the domain identifier component and wherein decoding contents of the external identifier AVP includes decoding the local identifier from the external identifier AVP. Performing the lookup in the local identifier table may also include searching the local identifier table for a range-based match on the local identifier component. In response to locating an entry corresponding to the local identifier component in the local identifier table, contents of the matching entry in the local identifier table are used as the Diameter routing information. In response to failing to locate a matching entry corresponding to the local identifier component in the local identifier table, the address resolution falls back to results of the lookup in the domain table and uses contents of the matching entry in the domain table as the Diameter routing information.

According to yet another aspect of the subject matter described herein, at least one peg counter is incremented based on results of the external identifier address resolution.

According to yet another aspect of the subject matter described herein, a system for Diameter signaling message external identifier address resolution and routing is provided. The system includes a Diameter signaling router (DSR). A plurality of message processors are located within the DSR. An external identifier address resolution module is implemented on at least one of the message processors for receiving a Diameter signaling message, decoding the Diameter signaling message and determining that an external identifier attribute value pair (AVP) is present in the Diameter signaling message, in response to determining that an external identifier AVP is present in the Diameter signaling message, decoding contents of the external identifier AVP, performing a lookup in a domain table using a domain identifier component of the external identifier AVP and locating an entry corresponding to the domain identifier, determining whether a local identifier table is configured for the domain identifier, in response to determining that the local identifier table is configured for the domain identifier, performing a lookup in a local identifier table using a local identifier component of the external identifier AVP, populating at least one Diameter routing AVP of the Diameter signaling message with Diameter routing information obtained from the lookup in the domain table or the lookup in the local identifier table. A Diameter routing module is located in the DSR for routing the Diameter signaling message using the Diameter routing information.

In one exemplary implementation, the DSR is configured to receive the Diameter signaling message on a Tsp interface and wherein the DSR further includes a Diameter decoding layer for decoding a device action grouped AVP and extracting the external identifier AVP from the device action grouped AVP. In another exemplary implementation, the external identifier address resolution module is configured to decode a domain identifier from the external identifier AVP.

In yet another exemplary implementation, the external identifier address resolution module is configured to search the domain table for exact match on the domain identifier component. In an alternate implementation, the external identifier address resolution module is configured to perform the external search the domain table for a longest subdomain match on the domain identifier. As used herein, the term "searching" includes extracting key or index values from table entries and comparing the key or index values to a search key or index. "Searching" may include searching for a match of an unhashed key or index value or a hashed key or index value.

In yet another exemplary implementation, a local identifier table is configured for the domain identifier component and the DSR includes a Diameter decoding layer for decoding the local identifier from the external identifier AVP. If a local identifier table is configured for the domain identifier component, the external identifier address resolution module may be configured to search the local identifier table for a range-based match on the local identifier component. If the external identifier address resolution module locates an entry corresponding to the local identifier component in the local identifier table, the external identifier address resolution module may be configured to use contents of the matching entry in the local identifier table as the Diameter routing information. If the external identifier address resolution module fails to locate a matching entry corresponding to the local identifier in the local identifier table, the external identifier address resolution module may be configured to fall back to results of the lookup in the domain table and use contents of the matching entry in the domain table as the Diameter routing information According to yet another aspect of the subject matter described herein, the external identifier address resolution module is configured to increment at least one peg counter based on results of the external identifier address resolution.

In yet another exemplary implementation of the subject matter described herein, a non-transitory computer readable medium having stored thereon executable instructions that when executed by a processor of a computer control the computer to perform steps is provided. The steps may be performed at a DSR including at least one processor. The steps include receiving a Diameter signaling message; decoding the Diameter signaling message and determining that an external identifier attribute value pair (AVP) is present in the Diameter signaling message; in response to determining that an external identifier AVP is present in the Diameter signaling message, decoding contents of the external identifier AVP; performing a lookup in a domain table using a domain identifier component of the external identifier AVP and locating an entry corresponding to the domain identifier component; determining whether a local identifier table is configured for the domain identifier component; in response to determining that the local identifier table is configured for the domain identifier, performing a lookup in a local identifier table using a local identifier component of the external identifier AVP; populating at least one Diameter routing AVP of the Diameter signaling message with Diameter routing information obtained from the lookup in the domain table or the lookup in the local identifier table; and routing the Diameter signaling message using the Diameter routing information.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings, of which.

DETAILED DESCRIPTION

The subject matter described herein relates to methods, systems, and computer readable media for Diameter signaling message external identifier address resolution and routing. The external identifier AVP includes a domain and a local identifier, each of which may be used for address resolution either individually or combined in a nested lookup to determine a routable destination address for a Diameter signaling message. Using the domain identifier for address resolution allows local network operators to assign different external identifiers to different services using a name space that is not limited by the numeric name spaces of conventional MSISDN and IMSI numbers.

Figure 1A:
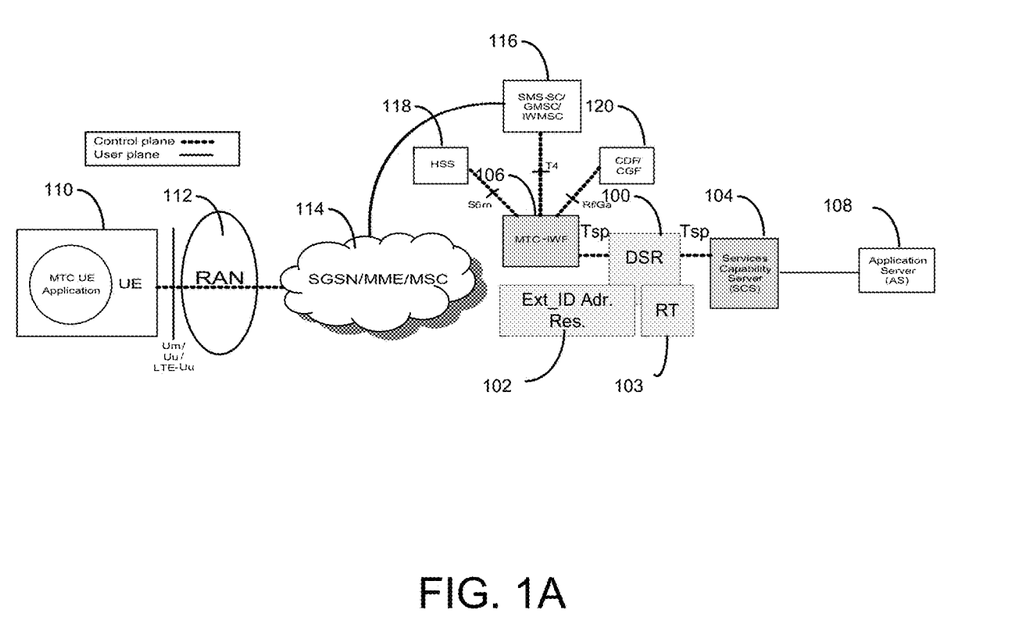
FIG. 1A is a network diagram illustrating a Diameter signaling network including a Diameter signaling router for performing external identifier address resolution on a Tsp interface.

FIG. 1A is a network diagram illustrating an exemplary scenario including a Diameter signaling router that performs external identifier address resolution and routing. As used herein, the term "Diameter signaling router" refers to a network node that implements Diameter routing agent (DRA) functionality, where Diameter routing agent functionality includes routing Diameter signaling messages based on contents of Diameter routing AVPs in the Diameter signaling messages. Other functionality that may be implemented by DSR 100 is described in IETF RFC 6733.

In FIG. 1A, DSR 100 includes external identifier address resolution module 102 for resolving external identifier AVP values into routable addresses. DSR 100 resides on the Tsp interface or reference point between a service capability server (SCS) 104 and a machine type communications interworking function (MTC-IWF) 106. An application server (AS) 108 is connected to SCS 104. AS 108 may perform functions relating to MTC devices, such as sending messages to trigger MTC devices to perform actions. In the illustrated example, a single MTC device 110 is connected to the core network via a radio access network (RAN) 112. The core network begins with serving general packet radio service support node (SGSN)/mobility management entity (MME)/mobile switching center (MSC) 114. SGSN/MME/MSC 114 is connected to a short message service-service center (SMS-SC)/gateway mobile switching center (GMSC)/interworking mobile switching center (IWMSC) 116, which provides short message service (SMS) and mobile switching services for MTC devices. MTC-IWF 106 is also connected to a home subscriber server (HSS) 118, which stores subscription data for MTC devices. MTC-IWF 106 is also connected to a charging data function (CDF)/charging gateway function (CGF) 120, which provides charging services to MTC devices.

In the scenario illustrated in FIG. 1A, an application, such as an MTC application resident on application server 108, may desire to send a message to MTC device 110. Examples of messages that may be sent by application server 108 include:

Request and confirmation of a device trigger;
Notification of a device trigger;
Recalling or replacing of an already submitted device trigger; and
Delivery of an MSISDN-less mobile originated SMS (MO-SMS) message.

Figure 1B:
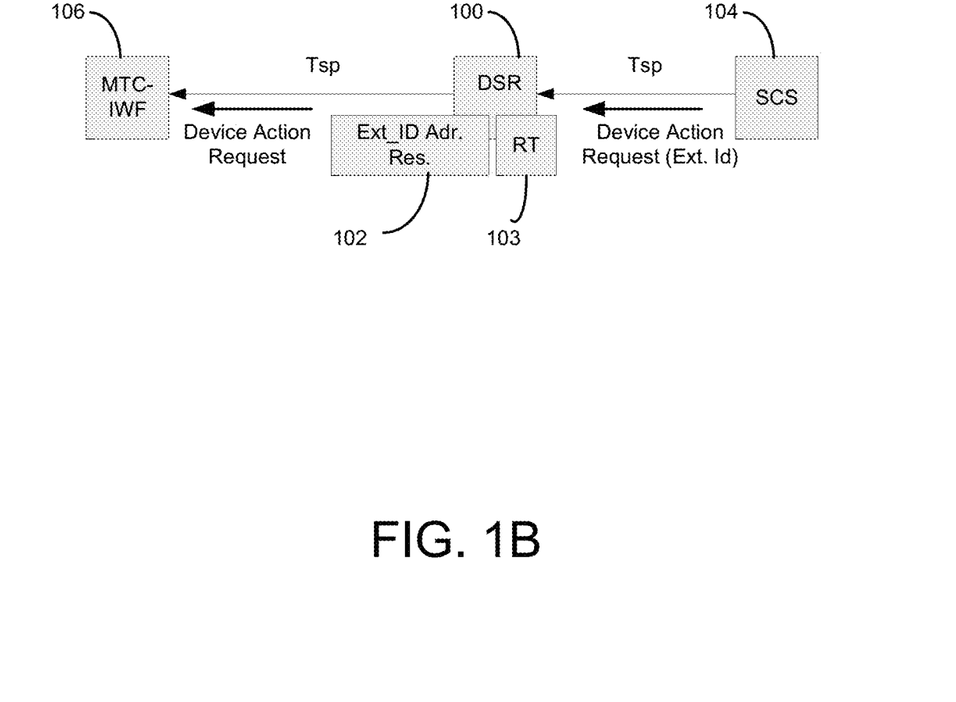
FIG. 1B is a network and message flow diagram illustrating a Diameter signaling network including a Diameter signaling router for performing external identifier address resolution on a Tsp interface.

FIG. 1B illustrates an example of external identifier address resolution for the Tsp interface illustrated in in FIG. 1A. Referring to FIG. 1B, SCS 104 sends a device action request message including the external identifier of an MTC user equipment (UE) application. The purpose of the message is to request that the MTC device take a certain action, such as wake up and report a measurement. The message needs to be sent to an MTC-IWF. 3GPP TS 29.368, "Technical Specification Group Core Networking and Terminals; Tsp interface protocol between the MTC Interworking Function (MTC-IWF) and Service Capability Server (SCS)," Release 15, June 2018, the disclosure of which is incorporated herein by reference in its entirety, indicates that MTC-IWF selection can be achieved using:

A preconfigured MTC-IWF identity;
Domain name system (DNS); or
Diameter routing.

For Diameter routing, 3GPP TS 29.368 states, "the destination route should be derived from the domain identifier part of the external identifier." Accordingly, DSR 100 may receive the device action request message. When communicated over the Tsp reference point, the MTC device's external identifier is contained in the external identifier AVP, which is present in the device-action grouped AVP. External identifier address resolution module 102 may decode the device action grouped AVP and extract the external identifier value from the device action grouped AVP. External identifier address resolution module 102 may perform a lookup in a domain table and to translate the domain identifier component of the external identifier into an identifier for MTC- IWF 106. An exemplary mechanism and data structure for performing this address resolution will be described in detail below. Once the domain identifier in the device action request is resolved into an identifier for an MTC-IWF, DSR 100 routes the device action request to MTC-IWF 106.

In FIGS. 1A and 1B, DSR 100 performs external identifier address resolution for messages received on a Tsp interface. However, the subject matter described herein is not limited to performing external identifier address resolution for messages received on a Tsp interface. Performing external identifier address resolution for any interface that currently or will in the future use external identifiers to identify network devices is intended to be within the scope of the subject matter described herein. For example, DSR 100 may also be located on an S6a interface between an MME and an HSS. Currently, Diameter update location request (ULR) messages received on the S6a interface use the IMSI to identify user devices. If external identifiers are used on the S6a interface to identify external devices, external identifier address resolution module 102 may perform external identifier address resolution as described herein to identify the HSS or HSS partition to which the ULR messages should be routed, and Diameter routing module 103 may route the ULR messages to the HSS or HSS partition identified in the address resolution.

In another example, DSR 100 may reside on the S6t interface between the service capability exposure function (SCEF) and the HSS. The S6t interface is described in 3GPP TS 29.336, "Technical Specification Group Core Network and Terminals Home Subscriber Server (HSS) diameter interfaces for interworking with packet data networks and applications," Release 15, June 2018, the disclosure of which is incorporated herein by reference in its entirety. In such an example, external identifier address resolution module 102 may perform external identifier address resolution for Diameter messages from the SCEF to the HSS on the S6t interface to identify the HSS to which the messages should be directed. Once the external identifier in the message is resolved into a routable address, Diameter routing module 103 may route the message to the HSS identified by results of the external identifier address resolution.

Figure 1C:
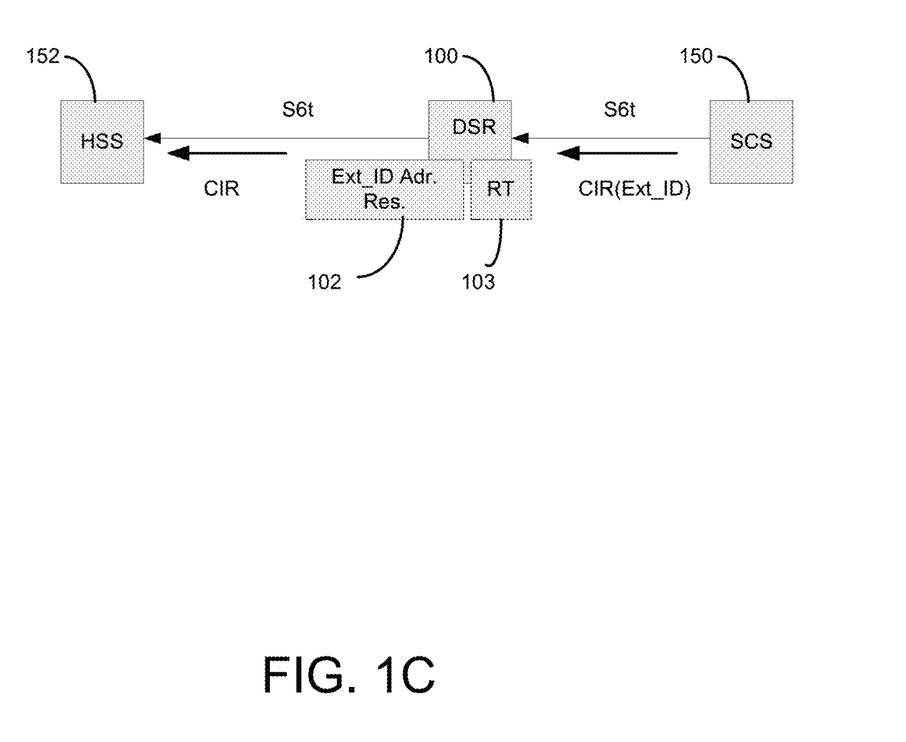
FIG. 1C is a network and message flow diagram illustrating a Diameter signaling network including a Diameter signaling router for performing external identifier address resolution on an S6t interface.

FIG. 10 is a diagram illustrating an example of DSR 100 operating on the S6t interface. Referring to FIG. 10, SCEF 150 may send a configuration information request (CIR) message to an HSS over the S6t interface. DSR 100 may receive the CIR message and pass the message to external identifier address resolution module 102. External identifier address resolution module 102 may determine that the message includes an external identifier and perform an address resolution using contents of the external identifier AVP using the methods described herein. Diameter routing module 103 may then route the message to the HSS identified in the external identifier address resolution.

Figure 2:
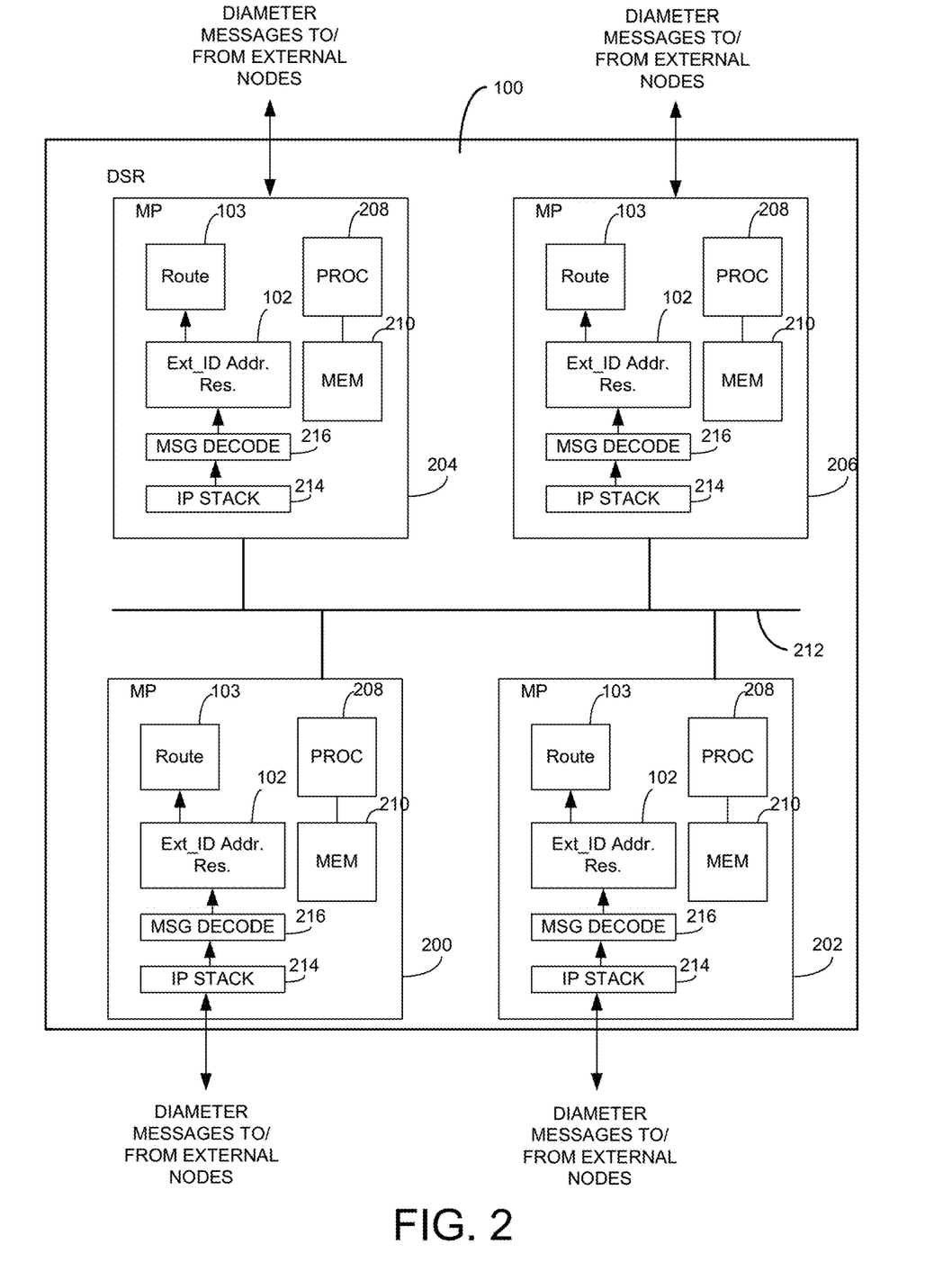
FIG. 2 is block diagram of a Diameter signaling router illustrating exemplary components for performing address resolution based on an external identifier AVP.

FIG. 2 is a block diagram illustrating the exemplary architecture for DSR 100 in performing external identifier address resolution. In FIG. 2, DSR 100 includes a distributed processing architecture, including a plurality of message processors 200, 202, 204, and 206. Message processors 200, 202, 204, and 206 each include a printed circuit board having at least one processor 208 and memory 210 mounted on the printed circuit board. Message processors 200, 202, 204, and 206 may be connected via a communications medium 212, which may be one or more Ethernet local area networks (LANs).

Each message processor 200, 202, 204, and 206 includes an IP stack 214 for sending and receiving messages over Internet protocol networks, a Diameter decoding layer 216 for decoding and extracting Diameter AVPs from Diameter signaling messages, external identifier address resolution module 102, and Diameter routing module 103.

When a message is received by one of message processors 200, 202, 204, and 206, the message is passed from IP stack 214 to Diameter decoding layer 216, which decodes and identifies one or more Diameter AVPs in the message. As illustrated in FIGS. 1A and 1B, DSR 100 is configured to receive Diameter signaling messages on a Tsp interface. In such an implementation, Diameter decoding layer 216 may decode a device action grouped AVP and extract the external identifier AVP from the device action grouped AVP.

If the message includes an external identifier AVP, the message may be passed to external identifier address resolution module 102. External identifier address resolution module 102 resolves the external identifier into one or more routable addresses and inserts the addresses in the Diameter message. The message is then passed to Diameter routing module 103, which routes the message based on the contents of the Diameter routing AVPs in the message. The message may then be sent to another of the message processors 200, 202, 204, and 206 for transmission to the next hop node to the destination in the Diameter signaling network.

Figure 3:
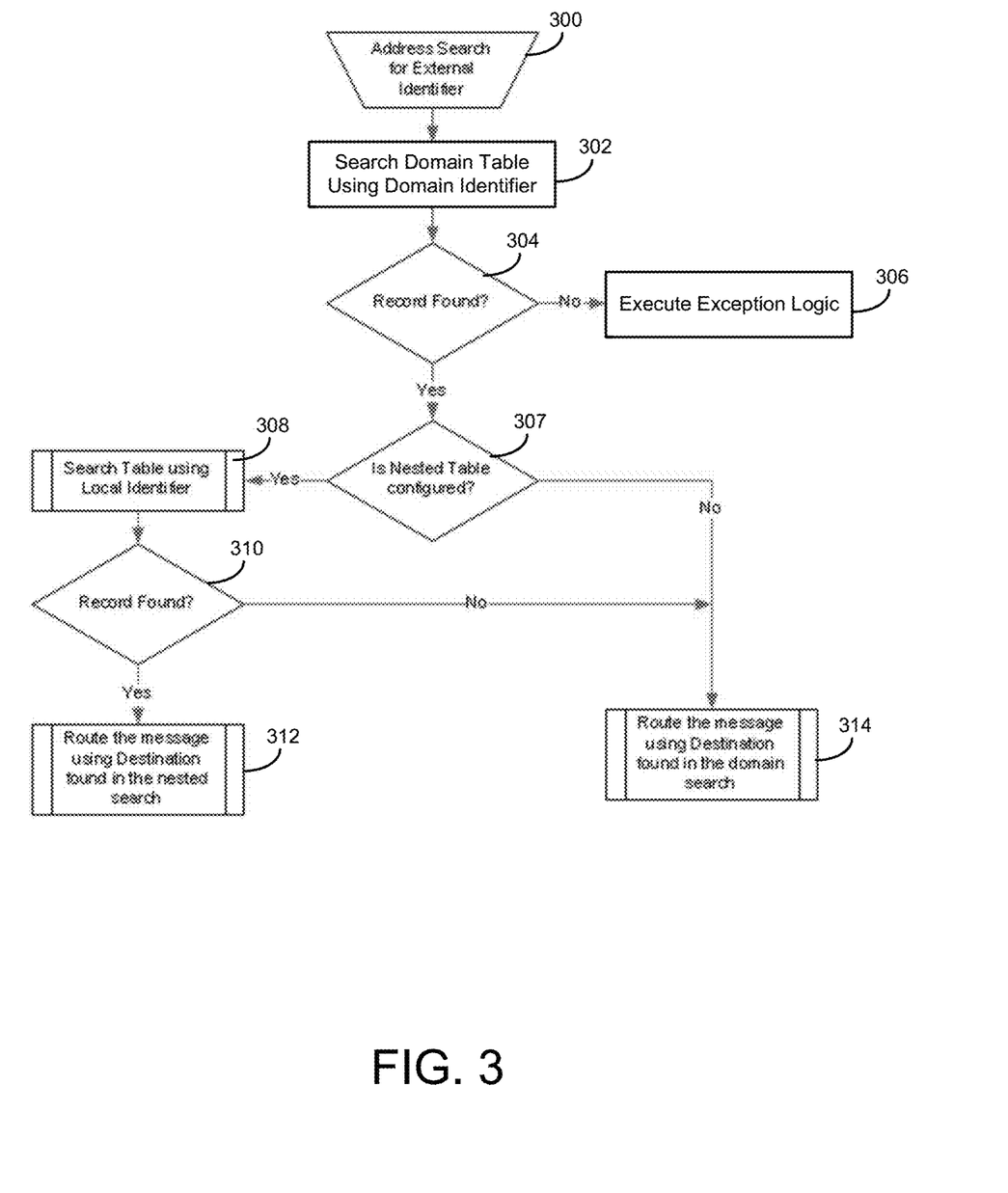
FIG. 3 is a flow chart illustrating an exemplary process for address resolution and routing based on an external identifier AVP.

FIG. 3 is a flow chart illustrating an exemplary process for performing external identifier address resolution that may be implemented by external identifier address resolution module 102. Referring to FIG. 3, in steps 300 and 302, the address resolution based on the external identifier begins by performing a lookup in a domain table for the domain identifier component in a received Diameter signaling message. In step 304, external identifier address resolution module 102 determines whether an entry corresponding to the domain identifier was found. If no record corresponding to the domain identifier is found, control proceeds from step 304 to step 306, where exception logic is executed. Executing exception logic may include attempting to resolve and address in the message based on another message parameter, such an IMSI or MSISDN in the message.

In step 304, if a record corresponding to the domain type is found, control proceeds to step 307 where it is determined whether a nested local identifier table is configured for the domain identifier located in the lookup in the domain table. As used herein, the term "nested local identifier table" refers to a table of local identifiers that may be configured for domain identifiers to allow a nested lookup using the local identifier component of the external identifier AVP.

If a nested local identifier table is configured, control proceeds to step 308, where the nested local identifier table is searched using the local identifier component of the external identifier in the message.

In step 310, external identifier address resolution module 102 determines whether a record corresponding to the local identifier component in the received Diameter signaling message is found. If a record corresponding to the local identifier is located, control proceeds from step 310 to step 312 where the message is routed using contents of the record found in the search of the local identifier table. Routing the message to the destination may include inserting the contents of the matching record into one or more Diameter routing AVPs in the message and transmitting the message to a message processor associated with an outbound signaling link corresponding to the destination or a next hop in the path to the destination.

If a matching local identifier is not found in the local identifier table lookup in step 310 or if a nested local identifier table is not configured for the domain component of the message in step 307, control proceeds to step 314 where the message is routed using the destination found in the domain search. Routing the message using the destination found in the domain search may include inserting contents of the matching record in the domain table into one or more Diameter AVPs in the message and transmitting the message to a message processor associated with an outbound signaling link corresponding to the destination or a next hop in the path to the destination.

Figure 4A:
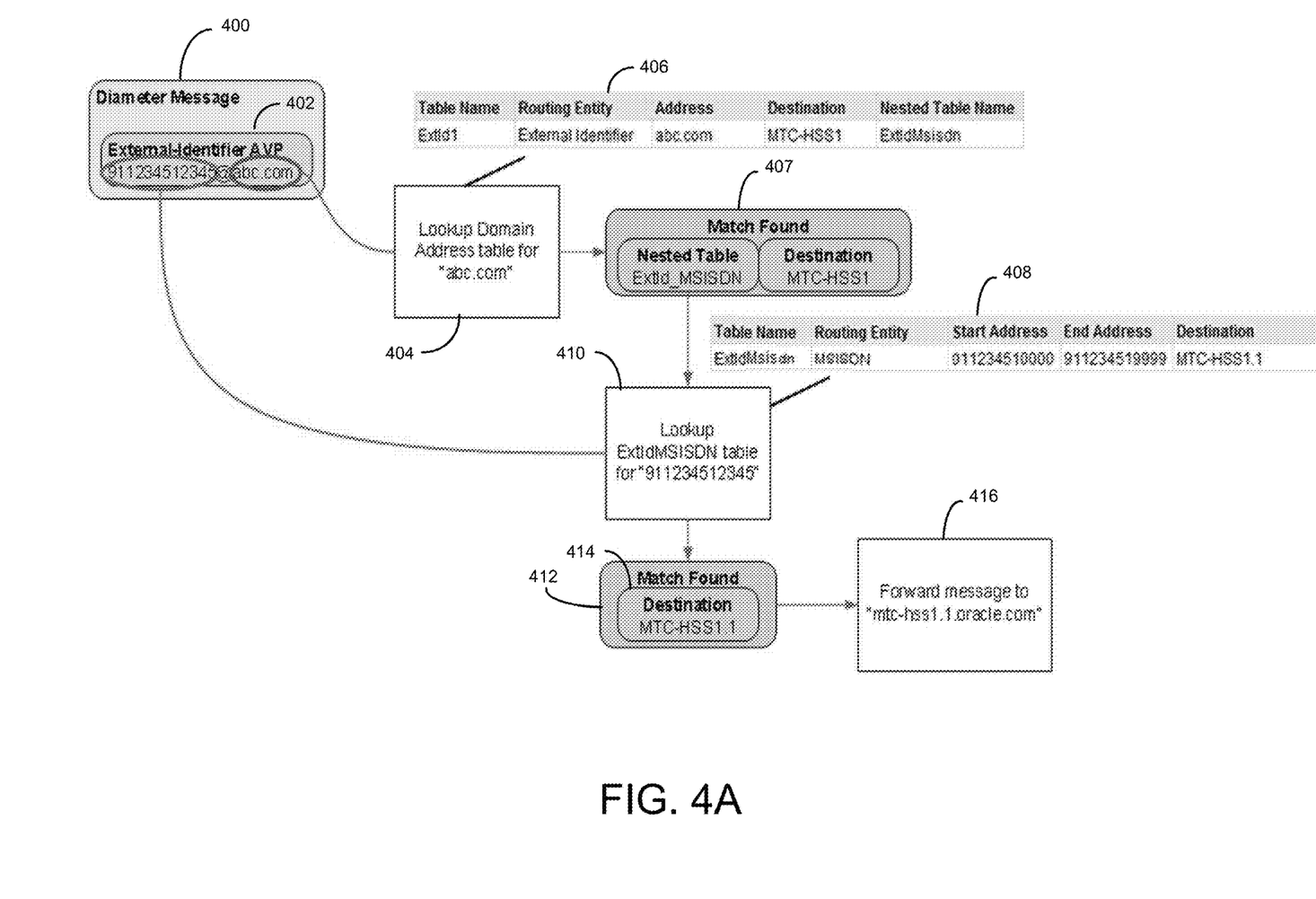
FIG. 4A is a block diagram illustrating external identifier address resolution where a nested local identifier lookup is successful and a received Diameter signaling message is forwarded to a second level destination.

FIG. 4A illustrates one example of a successful lookup in local identifier table where a received Diameter message is forwarded to a second level destination corresponding to the local identifier. As used herein, a first level destination refers to a destination corresponding to the domain identifier in a message, and a second level destination refers to a destination corresponding to a local identifier in the message. In one example, a first level destination may be a network node, such as an MTC-IWF or HSS, and a second level destination may be a real or virtual partition of the MTC-IWF or HSS assigned to a particular group of users, such as MTC devices.

Referring to FIG. 4A, a Diameter signaling message 400 may be an ingress message received at DSR 100. In the illustrated example, Diameter signaling message 400 includes an external identifier AVP 402. External identifier AVP 402 contains the external identifier 911234512845@abc.com.

In FIG. 4A, the external identifier address resolution begins with step 404, where an address resolution lookup is performed based on the domain identifier component of Diameter signaling message 400. The lookup may be performed in a domain table 406 that maps external identifiers to destinations. In the illustrated example, domain table 406 maps the domain abc.com to the destination MTC-HSS1. Accordingly, in step 407 a match in domain table 406 is found for the domain identifier in received Diameter signaling message 400.

A nested local identifier table 408 is configured for the entry in domain table 406. In FIG. 4A, nested local identifier table 408 is labeled or named Ext_Id_MSISDN. Nested local identifier table 408 maps a range of MSISDN numbers from 9112345100000 to 91123451999 to a destination of MTC-HSS1.1. The local identifier in Diameter signaling message 400 of 911234512345 falls within this range.

After the lookup in domain table 406, control proceeds to step 410 where a lookup is performed in nested local identifier table 408 using the local identifier component of the external identifier in received Diameter signaling message 400. In step 412, a matching entry in nested local identifier table 408 is found.

In step 414, Diameter signaling message 400 is modified to include an identifier for the second level destination obtained from nested local identifier table 408. Modifying the message may include populating one or more Diameter routing AVPs in the message with the identifier MTC-HSS1.1.com.

In step 416, the message is forwarded to the destination. In the illustrated example, the destination for the message is MTC-HSS1.1.oracle.com.

Figure 4B:
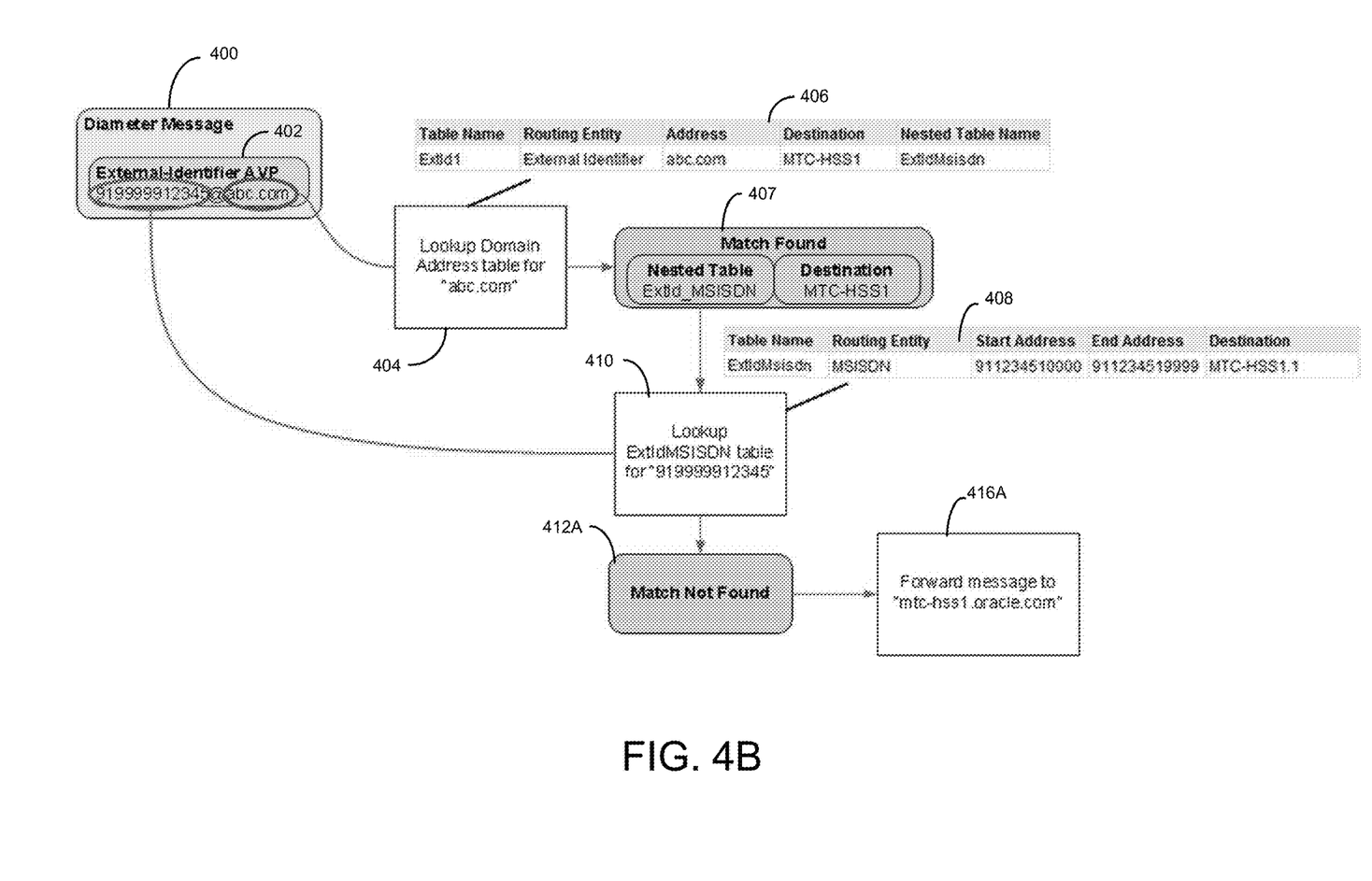
FIG. 4B is a block diagram illustrating an external identifier address resolution where the nested local identifier lookup is not successful and the message is routed to a first level destination.

FIG. 4B illustrates an alternate scenario in which the nested lookup is unsuccessful and the external identifier address resolution falls back to a first level destination located in lookup in the domain table. Referring to FIG. 4B, in step 404, a lookup is performed in domain table 406 for the domain abc.com. In step 407, a record corresponding to the domain abc.com is located. In addition, a nested local identifier table 408 is configured for the record.

In step 410, a lookup is performed in nested local identifier table 408. In this example, in step 412A, a match is not found. Accordingly, in step 416A, the external identifier address resolution falls back to the destination located in the external identifier address resolution located in the external identifier address resolution based on the lookup in the domain table. In this example, the lookup in the domain table resulted in a destination of MTC-HSS1. Accordingly, the message is modified to include the domain identifier MTC-HSS1, and the message is forwarded to MTC-HSS1.oracle.com.

Configurable Options for External Identifier Address Resolution

In the examples illustrated in FIG. 4A, external identifier address resolution module 102 searches the domain table for an exact match on the domain identifier component of the external identifier followed by a search of a local identifier table for a range-based match on the local identifier component of the external identifier. In FIG. 4B, external identifier address resolution module 102 searches the domain table for an exact match on the domain identifier and falls back to the destination located in the domain table lookup after a failed lookup in the local identifier table based on the local identifier component. However, the subject matter described herein is not limited to these examples. External identifier address resolution as described herein may be configurable by the network operator to perform the external identifier address resolution based on:

1. An exact or partial match on the domain identifier component alone; or
2. An exact or partial match on the domain identifier component in combination with an exact or partial match on the local identifier component.

The following example illustrates lookups and data structures that may be used for an exact match based on the domain identifier component followed by a range-based match using the local identifier component, similar to the example in FIG. 4A. For example, the external identifier in a received message may be:

9194939000@department1.abccorp.com, and domain table 406 may be configured as follows:

TABLE 1

Example Domain Table

| Table ID | Routing Entity | Address | Destination | Nested Table ID |
|---|---|---|---|---|
| ExtID1 | External Identifier | department1.abccorp.com | MTC-HSS1 | ExtID_MSISDN1 |
| ExtID1 | External Identifier | department2.abccorp.com | MTC-HSS2 | ExtID_MSISDN2 |
| ExtID1 | External Identifier | department3.abccorp.com | MTC-HSS3 | ExtID_MSISDN3 |

When a Diameter message having the external identifier 9194939000@department1.abccorp.com is received, a lookup in Table 1 will be performed using the domain identifier department1.abccorp.com from the message. The result of the lookup is an exact match with the first entry in the table. In this example, a nested table is configured, so a lookup may be performed using the local identifier in the following table using the local identifier 9194938000. Table 2 shown below is an example of a nested local identifier table that may be configured for the lookup using the local identifier component.

TABLE 2

Example Local Identifier Table

| Table ID | Routing Entity | Start Address | End Address | Nested Table ID |
|---|---|---|---|---|
| Ext_Id_MSISDN1 | MSISDN | 9194937000 | 9194927999 | MTC-HSS1.1 |
| Ext_Id_MSISDN1 | MSISDN | 9194938000 | 9194938999 | MTC-HSS1.2 |
| Ext_Id_MSISDN1 | MSISDN | 9194939000 | 9194939999 | MTC-HSS1.3 |

In this example, the local identifier in the message matches the second entry in the table, because 9194938000 within the range of 9194938000 to 9194938999. The address of MTC-HSS1.2 would then be inserted in the Diameter portion of the message and the message would be routed to MTC-HSS2, which may be a real or virtual partition of MTC-HSS1 assigned to MTC devices whose local identifiers fall within given ranges of local identifiers.

In yet another alternate implementation, external identifier address resolution module 102 may implement an exact match based on the domain identifier followed by a range-based and exact match on the local identifier with priority given to exact or individual address matches over range-based matches. For this example, assume that a message arrives at Diameter signaling router 100 with the external identifier:

9194939001@department1.abccorp.com.

Assume that the domain table is provisioned as in Table 1 above. External identifier address resolution module 102 may perform a lookup in the domain table and determine that the domain in the message, department1.abccorp.com, matches the first entry in the table, which has nested table configured called ExtID_MSISDN1. Assume that the nested table is configured as indicated below in Table 3:

TABLE 3

Example Local Identifier Table

| Table ID | Routing Entity | Start Address | End Address | Nested Table ID |
|---|---|---|---|---|
| ExtID_MSISDN1 | MSISDN | 9194937000 | 9194927999 | MTC-HSS1.1 |
| ExtID_MSISDN1 | MSISDN | 9194938000 | 9194938999 | MTC-HSS1.2 |
| ExtID_MSISDN1 | MSISDN | 9194939000 | 9194939999 | MTC-HSS1.3 |
| ExtID_MSISDN1 | MSISDN | 9194939001 | 9194939001 | MTC-HSS1.4 |

In this example, the local identifier matches two entries in the table—the last entry with the local identifier 9194939001 and the second-to-last entry with the local identifier range 9194939000-9194939001. The second-to-last entry in Table 3 is considered to be an entry keyed or indexed by an individual local identifier because the start and end ranges for the entry are the same.

Because priority is given to individual entry matches over range-based matches, external identifier address resolution module 102 may select the last entry in Table 3 as the matching entry. Accordingly, external identifier address resolution module 102 may insert the destination address of MTC-HSS1.4 in a Diameter routing AVP of the Diameter signaling message and forward the message to MTC-HSS1.4. Thus, address resolution module 102 may be configured to recognize exact and range-based matches on local identifiers and may give priority to matches based on individual local identifiers that also fall in ranges of local identifiers.

In the examples above, a domain lookup is performed followed by a lookup based on numeric local identifiers. In one configuration option, if the local identifier is non-numeric, external identifier address resolution module 102 may perform a lookup based on the domain identifier and resolve the domain identifier into a routable address without performing the lookup in the nested table configured for local identifiers. For example, if external identifier address resolution module 102 is presented with the external identifier:

thermostat@department1.abccorp.com, using the data in Table 1 above, the external identifier matches the first entry in the table. There is a nested table for local identifiers. However, the local identifier "thermostat" is non-numeric. In this situation, external identifier address resolution module 102 may use the address from the domain table of MTC-HSS1 as the destination address for the message, insert the address in a Diameter routing AVP in the message, and may route the message to MTC-HSS1. Thus, external identifier address resolution module 102 may be configured to fall back to results of a domain table address resolution lookup event where there is a nested table configured for translating the local identifier in a message when the local identifier in the message is non-numeric.

In an alternate configuration option, external identifier address resolution module 102 may be configured to perform address resolution for non-numeric local identifiers. In the example above, the identifier "thermostat" may be translated into the destination address for a partition of an HSS or MTC-IWF provisioned to handle messages relating to thermostat devices in the particular department.

As stated above, in one exemplary implementation, external identifier address resolution module is configurable to perform a longest subdomain match on the domain identifier component of the external identifier AVP. Such an option may be configurable by a network operator using a graphical user interface used to configure external identifier address resolution module 102. If the longest subdomain match on domain identifier is enabled, configured domain identifiers will be matched for a longest subdomain match on the domain identifier component of the external identifier received in the ingress Diameter message. For example, domain table 406 may be configured with the following domain identifiers and destinations:

Domain-ID=tuvw.xyz.com; Destination=HSS1
Domain-ID=xyz.com; Destination=HSS2

If the external identifier AVP of an ingress Diameter request message contains abc@mno.pqrs.tuvw.xyz.com, external identifier address resolution module 102 will match the domain identifier in the message to the entry in domain table 406 with the domain ID tuvw.xyz.com, because tuvw.xyz.com is the longest matching domain in the domain table. External identifier address resolution module 102 will then insert the address for HSS1 in the message, and Diameter routing module 103 will route the message to HSS1.

If the external identifier AVP of an ingress Diameter request message contains abc@asgssf.xyz.com, external identifier address resolution module 102 will match the domain identifier in the message to the entry in domain table 406 with domain identifier xyz.com, because xyz.com is the longest matching subdomain in domain table 406. External identifier address resolution module 102 will then insert the address for HSS2 in the message, and Diameter routing module 103 will route the message to HSS2.

If the external identifier of an ingress Diameter request message contains abc@mno.pqrs.tuvwxyz.com then there is no match with any of the configured domain identifiers. In this case, address resolution may fall through to another type of address resolution, e.g., based on the IMSI, MSISDN, or other configured parameter. If none of the configured types of address resolution result in a routable destination address for a message, DSR 100 may send an error message to the message sender.

Thus, external identifier address resolution module 102 may be configured to perform longest subdomain mapping based on the domain identifier component of the external identifier AVP.

External Identifier Address Resolution Peg Counters

According to another aspect of the subject matter described herein, external identifier address resolution module 102 may maintain measurements, referred to as peg counters, based on successful and unsuccessful external identifier address resolutions. The measurements may also indicate the type of external identifier address resolution that is performed. Measurements performed by external identifier address resolution module 102 are referred to as peg counters. A peg counter is incremented each time a corresponding event occurs. Examples of peg counters that may be maintained by external identifier address resolution module 102 include:

Resolved Domain Component—this counter is pegged or incremented when a destination is resolved using the domain identifier component of the external identifier.

Domain Component Resolution Failures—this counter is pegged when a valid domain component is extracted from an external identifier AVP but the lookup fails to find a match.

Resolved Local Identifiers—this counter is pegged when an address resolution is successful with the routing entity type of external identifier and using the local identifier component. The value of this counter thus represents the number of addresses successfully resolved with routing entity type external identifier using the local Identifier component.

Domain Fallbacks—this counter is pegged when a local identifier address resolution fails and falls back to address resolution based on the domain component of the external identifier. The value of this counter thus represents the number of addresses that fell back to a domain resolution because of a failed local identifier resolution attempt.

Local ID Not Numeric—this counter is pegged whenever range-based local address resolution is skipped because the local identifier is not numeric. Thus, the value of this counter represents the number of addresses for which a range based local Identifier resolution was skipped because the Local Identifier value was not numeric.

Longest Subdomain Match—this counter is pegged whenever a longest subdomain match is successful. Thus, the value of this counter represents the number of addresses that resulted in a successful resolution because of a longest subdomain match.

External identifier address resolution module 102 may maintain these and other peg counters regarding external identifier address resolutions. The peg counters may be provided to the network operator via an administrative interface. The network operator may use the peg counters to monitor performance of external identifier address resolution module 102.

By performing external identifier address resolution based on the domain identifier component and the local identifier component of the external identifier, external identifier address resolution module 102 provides for fine grained division of services within a service provider's network. For example, MTC devices with different local identifiers can be assigned to different MTC-IWFs, different HSSs, or different MTC-IWF or HSS partitions. Similarly, by providing for resolution of the domain identifier component of the external identifier based on a longest subdomain match, the network service provider may provision different services for MTC devices having different subdomains.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for Diameter signaling message external identifier address resolution and routing, the method comprising:

at a Diameter signaling router (DSR) including at least one processor:
receiving a Diameter signaling message;
decoding the Diameter signaling message and determining that an external identifier attribute value pair (AVP) is present in the Diameter signaling message;
in response to determining that an external identifier AVP is present in the Diameter signaling message, decoding contents of the external identifier AVP;
performing a lookup in a domain table using a domain identifier component of the external identifier AVP and locating an entry corresponding to the domain identifier;
determining whether a local identifier table is configured for the domain identifier component;
in response to determining that the local identifier table is configured for the domain identifier component, performing a lookup in a local identifier table using a local identifier component of the external identifier AVP;
populating at least one Diameter routing AVP of the Diameter signaling message with Diameter routing information obtained from the lookup in the domain table or the lookup in the local identifier table; and
routing the Diameter signaling message using the Diameter routing information.

2. The method of claim 1 receiving a Diameter signaling message includes receiving a Diameter signaling message on an S6a, an S6t, or a Tsp interface.

3. The method of claim 2 wherein the interface comprises a Tsp interface and wherein decoding the Diameter signaling message to determine that an external identifier is present includes decoding a device action grouped AVP and extracting the external identifier AVP from the device action grouped AVP.

4. The method of claim 1 wherein performing the lookup in the domain table includes searching the domain table for an exact match on the domain identifier component.

5. The method of claim 1 wherein performing the lookup in the domain table includes searching the domain table for a longest subdomain match on the domain identifier component.

6. The method of claim 1 wherein a local identifier table is configured for the domain identifier component and wherein decoding contents of the external identifier AVP includes decoding the local identifier from the external identifier AVP.

7. The method of claim 6 wherein performing the lookup in the local identifier table includes searching the local identifier table for a range-based match on the local identifier component.

8. The method of claim 6 comprising, in response to locating an entry corresponding to the local identifier component in the local identifier table, using contents of the entry in the local identifier table as the Diameter routing information.

9. The method of claim 6 comprising, in response to failing to locate an entry corresponding to the local identifier in the local identifier table, falling back to results of the lookup in the domain table and using contents of the matching entry in the domain table as the Diameter routing information.

10. The method of claim 1 comprising incrementing at least one peg counter based on results of the external identifier address resolution.

11. A system for Diameter signaling message external identifier address resolution and routing, the system comprising:
   a Diameter signaling router (DSR);
   a plurality of message processors located within the DSR;
   an external identifier address resolution module implemented on at least one of the message processors for receiving a Diameter signaling message, decoding the Diameter signaling message and determining that an external identifier attribute value pair (AVP) is present in the Diameter signaling message, in response to determining that an external identifier AVP is present in the Diameter signaling message, decoding contents of the external identifier AVP, performing a lookup in a domain table using a domain identifier component of the external identifier AVP and locating an entry corresponding to the domain identifier, determining whether a local identifier table is configured for the domain identifier, in response to determining that the local identifier table is configured for the domain identifier, performing a lookup in a local identifier table using a local identifier component of the external identifier AVP, populating at least one Diameter routing AVP of the Diameter signaling message with Diameter routing information obtained from the lookup in the domain table or the lookup in the local identifier table; and
   a Diameter routing module located in the DSR for routing the Diameter signaling message using the Diameter routing information.

12. The system of claim 11 wherein the DSR is configured to receive the Diameter signaling message on a Tsp interface and wherein the DSR further includes a Diameter decoding layer for decoding a device action grouped AVP and extracting the external identifier AVP from the device action grouped AVP.

13. The system of claim 11 wherein the external identifier address resolution module is configured to search the domain table for an exact match on the domain identifier component.

14. The system of claim 11 wherein the external identifier address resolution module is configured to search the domain table for a longest subdomain match on the domain identifier component.

15. The system of claim 11 wherein a local identifier table is configured for the domain identifier component and wherein the DSR includes a Diameter decoding layer for decoding the local identifier from the external identifier AVP.

16. The system of claim 15 wherein the external identifier address resolution module is configured to search the local identifier table for a range-based match on the local identifier component.

17. The system of claim 15 wherein the external identifier address resolution module is configured to, in response to locating an entry corresponding to the local identifier component in the local identifier table, use contents of the entry in the local identifier table as the Diameter routing information.

18. The system of claim 15 wherein the external identifier address resolution module is configured to, in response to failing to locate an entry corresponding to the local identifier in the local identifier table, fall back to results of the lookup in the domain table and use contents of the entry in the domain table as the Diameter routing information.

19. The system of claim 11 wherein the external identifier address resolution module is configured to increment at least one peg counter based on results of the external identifier address resolution.

20. A non-transitory computer readable medium having stored thereon executable instructions that when executed by a processor of a computer control the computer to perform steps comprising:
   at a Diameter signaling router (DSR) including at least one processor:
      receiving a Diameter signaling message;
      decoding the Diameter signaling message and determining that an external identifier attribute value pair (AVP) is present in the Diameter signaling message;
      in response to determining that an external identifier AVP is present in the Diameter signaling message, decoding contents of the external identifier AVP;
      performing a lookup in a domain table using a domain identifier component of the external identifier AVP and locating an entry corresponding to the domain identifier component;
      determining whether a local identifier table is configured for the domain identifier component;
      in response to determining that the local identifier table is configured for the domain identifier, performing a lookup in a local identifier table using a local identifier component of the external identifier AVP;
      populating at least one Diameter routing AVP of the Diameter signaling message with Diameter routing information obtained from the lookup in the domain table or the lookup in the local identifier table; and
      routing the Diameter signaling message using the Diameter routing information.

* * * * *

UNITED STATES PATENT AND TRADEMARK OFFICE
CERTIFICATE OF CORRECTION

| | | |
|---|---|---|
| PATENT NO. | : 10,637,779 B1 | Page 1 of 1 |
| APPLICATION NO. | : 16/162101 | |
| DATED | : April 28, 2020 | |
| INVENTOR(S) | : Mukherjee et al. | |

It is certified that error appears in the above-identified patent and that said Letters Patent is hereby corrected as shown below:

On the Title Page

In Column 2, Item (74) under Attorney Agent, or Firm, Line 1, delete "Taylor" and insert -- Taylor, --, therefor.

In the Specification

In Column 2, Line 64, delete "S6a." and insert -- S6a, --, therefor.

In Column 4, Line 32, delete "information" and insert -- information. --, therefor.

In Column 6, Line 39, delete "in in" and insert -- in --, therefor.

In Column 7, Line 42, delete "FIG. 10" and insert -- FIG. 1C --, therefor.

In Column 7, Line 43, delete "FIG. 10," and insert -- FIG. 1C, --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*